United States Patent [19]
Robson

[11] Patent Number: 4,529,612
[45] Date of Patent: Jul. 16, 1985

[54] POLLEN-FORTIFIED HONEY PRODUCT AND METHOD OF MAKING THE HONEY PRODUCT

[76] Inventor: Charles H. Robson, 6241 S. 30th St., Phoenix, Ariz. 85040

[21] Appl. No.: 557,446

[22] Filed: Dec. 2, 1983

[51] Int. Cl.$^3$ ............................ A23L 1/08; A23L 1/30
[52] U.S. Cl. .................................... 426/658; 426/641; 426/648; 426/810
[58] Field of Search ................. 426/658, 69, 656, 641, 426/648; 127/29, 33

[56] References Cited

U.S. PATENT DOCUMENTS 3,780,185  12/1973  Fields .................................... 426/72
3,879,567  4/1975   Verner ................................... 426/311
4,426,397  1/1984   Schanze ................................. 426/658

FOREIGN PATENT DOCUMENTS 0087669  9/1983  European Pat. Off. ............ 426/658
2463587  4/1981  France ................................. 426/658

Primary Examiner—Jeanette Hunter
Attorney, Agent, or Firm—Nelson & Roediger

[57] ABSTRACT

A method of producing fortified honey by selecting pollen types, drying pollen at low temperatures, milling and mixing same to form a water-pollen solution. Then, this solution is blended with low viscosity honey to form a concentrated solution for later addition to processed honey.

12 Claims, No Drawings

POLLEN-FORTIFIED HONEY PRODUCT AND METHOD OF MAKING THE HONEY PRODUCT

BACKGROUND OF THE INVENTION

This invention relates to a honey product fortified by the addition of pollen and to a process for making the honey product.

For as long as man has maintained records of human activity and events, the food substance honey has received attention as a nutritious material well-suited for human consumption. In fact, biblical references to the beneficial results occurring from the consumption of natural honey are made. The substance honey is a product of the activity of honeybees and initially it was obtained by gathering from the wild swarms of honeybees which built their honeycombs in a multitude of different places. Over the years, honey became recognized as a natural foodstuff with nutritionally beneficial results to the consumer.

As society progressed, the nutritional and sweetener values of honey became more well-known and the beekeeper assembled swarms in a controlled environment so that he would not have to travel in search of honey accumulations. The science of beekeeping then developed and the domestication of the colonies of honeybees took place. Thus, the product was made available to increasing numbers of people throughout the world. These new consumers of honey valued honey primarily as a sweetening agent.

The product honey began to be increasingly incorporated in prepared foods, notably baked foodstuffs, as well as enjoying increasing usage as an individual sweetener. The beekeeping industry expanded and mechanical innovations were introduced in aid of the beekeeper. Over one hundred years ago, the removable frame for supporting the comb structure in which the honeybees deposit the honey found widespread acceptance in the industry.

Additional innovation took place with the aim of automating the beekeeping and honey gathering operations as much as practical. These innovations include the use of artificial comb-like structures for incorporation in the removable frame along with automatic "uncapping" machines which carve away the outer layers of honey deposited by the bees to cap the individual cells in the combs. Now, the removable frame and comb structures therein are typically placed in the upper portion of the manufactured beehive structure and the queen bee is denied access to the region wherein honey is deposited. The feeding of the bees including the queen, takes place in the underlying chamber wherein the pollen gatherers return with their food supplies.

While all bees come into contact with and ingest pollens in their travels, the gathering of pollen and placement thereof as pellets in pouches in the legs of the female worker bees is the food source for the colony. The nutritional value of pollen has gained increasing attention over the years and it is widely recognized and consumed as a dietary supplement. A variety of innovations have been made in the hive structure to trap pollen from the gatherers as they return to the colony. Today, pollen is an important nutritional product consumed throughout the world because of its nutritional qualities, notably the high amino acid content of pollen.

The emphasis in the beekeeping industry has come to providing a host of hive products for consumers. The two primary products are honey processed for use as a sweetening agent or additive and a number of nutritional products, typically pollen, which are consumed for the different health benefits ascribed thereto.

Today, the processing of honey is directed to the provision of a translucent, clear liquid sweetener and the consumer has come to regard the thin golden liquid, processed honey, as a premium product. To reach the goal of a clear liquid, the beekeeper has removed the viscous honey endcapping of the cell and provided the processor with the more fluid or less viscous central section of the honey in the cell. The processor in turn takes this portion of the bees honey and subjects it to an elevated temperature, often as high as 200° F. to clarify and purify.

Further clarification is achieved by adding diatomaceous earth to the honey and then subjecting it under pressure to a multiplicity of filters. The diatomaceous earth forms an agglomerate with any residual pollen in the honey to thereby assist the filters in removing all components from the liquid except the honey. The result found in the marketplace is a clear liquid which is a premium sweetening agent. The processing steps to achieve a clear uniform liquid has destroyed or removed many of the nutrients that created the reputation of honey as a highly nutritious foodstuff over these many centuries. Sugars found in processed honey are readily digestible by humans and these sugars are essentially undisturbed by the processing. However, the value of honey as a dietary supplement is markedly reduced in the automated process steps necessary to provide large volumes of the clear golden liquid sweetener.

Accordingly, an object of the present invention is to provide a fortified honey product wherein nutritional value is added. The process by which this product is made includes a novel sequence of steps directed to the introduction of pollen to processed honey. The process permits the addition of the pollen in a form which does not significantly alter the appearance or viscosity of the resultant product when compared with the conventional processed honey. Further, the invention is directed to providing a honey-pollen product which more closely approximates the composition of the honey product produced by the honeybee in the hive.

SUMMARY OF THE INVENTION

The present invention is directed to a method of fortifying honey with pollen to compensate for nutritional values reduced or destroyed in the steps of gathering and processing honey for human consumption.

The method of restoring nutritional values to processed honey includes the selection of pollen grains collected from hives that contain bees which have been active in gathering pollen from plant species providing high concentrations of minerals, vitamins and amino acids. The pollen grains are subjected to a low temperature drying process for a period of time sufficient to reduce the moisture content to approximately six percent. The low temperatures for drying are selected to not exceed 140° F. and are maintained for relatively long periods of time, typically 6 hours.

Then, the low moisture content pollen grains are milled to a fine powder form. This powdered pollen is mixed with water in approximately equal parts by weight to form a first solution. This solution is filtered through fine mesh screens to remove any undissolved solids from the first solution. The solids include the fibrous plant material collected by the bees and incorporated in the pollen pellets assembled by the bees for transport in their body pouches.

After filtering, the first solution is added to a controlled amount of reduced viscosity honey and mixed therewith to form a concentrate. Honey at room temperatures is a viscous fluid and is heated to promote its fluidity prior to the addition of the first solution and the intermixing thereof to form a second solution. This concentrated second solution is added to a larger amount of conventionally processed honey thereby reintroducing pollen and its nutritional values back to the honey approximating the product originally manufactured by the honeybee and deposited in the comb-like structure in the hive body.

Further features and advantages of the invention will become more readily apparent from the following detailed description of specific embodiments thereof.

DESCRIPTION OF PREFERRED EMBODIMENT

This novel method of restoration of nutritional values to processed honey and the products formed thereby is directed to a sequence of steps for compensating in a practical manner for the mechanization of the tasks performed by the modern-day beekeeper and the large processing facility dealing as it normally does with the accumulations of several suppliers.

As the honeybee forages for the nectar that his body will process to later deposit as honey in the comb-like structure provided for him by the beekeeper, the honeybee both contacts and ingests pollen. The ingested pollen has been considered as a contaminant to honey products and is usually concentrated in the externally exposed thicker honey deposited by the bee at the outer surface of the comb structure. It has been long recognized that the honeybee varies the composition of honey as it is secreted in the receptacle. Today, this more viscous honey cap is readily removed by the beekeeper's machines which pare off both outer surfaces in a mechanized process which operates on up to 60 comb structures in one minute. The comb structure itself is no longer formed entirely by the bee. It is now a foundation provided for bee activity and honey deposition and contained in removable frames located in a separate region, typically the top, of the hive body. The industry has automated and moved on from the prior used method of draining and then squeezing the comb to gather as much of the honey as possible. Today, the beekeeper sacrifices outer layers of honey to reduce the costs involved and time required for gathering honey for the processor.

The processor receives the central core of honey and present practice is for him to rapidly heat the honey to 180° to 200° F. for a few minutes prior to adding an agglomerating agent. The agent assists in the subsequent removal of other hive products; such as pollen, propolis and beeswax. The honey and agent are then passed through an extensive pressurized filtration process to provide the golden clear liquid sweetener available to the consuming public. All of the pollen and its nutrients have been removed by the beekeeper and the processor. Also, the high treatment processing has eliminated the enzymes and amino acids in the processed product.

The present invention begins with the selection of pollen grains from that plant life having the better nutritional values for that season. This data has been compiled by the industry and published initially in the 1940's. The reintroduction of the nutritional values of pollen into honey which has been processed requires that the hardened shell or outer layer of the grain formed by the pollen-gathering bees be treated by milling to permit subsequent usage.

To this end, the method requires that the pollen grains be dried at low temperatures to an approximate moisture content of six percent. The low temperature is less than 140° F., the temperature at which the amino acids of the pollen are destroyed. The preferred range of temperature is 105° to 115° F. which is formed to enable the moisture content of the grains to be reduced to the level needed for subsequent processing steps. At this low temperature range the time required for drying varies between 4 and 12 hours based on the moisture content of the pollen grains initially. Typically the initial content varies from 8 to 12 percent by weight.

When dried, the pollen grains are milled to a fine powder. Best results for the process occur with a two stage milling process with a course mill overcoming the resistance of the external coating provided by the bee as he assembled the grain for transport to the hive. The grinding and milling are used for making a first solution which enables any foreign materials such as plant fibers to later be filtered out. The preferred size for the pollen powder enables it to pass through a 60 mesh screen. The preparation of the powder normally requires 3 hours in a two-stage operation.

The dried pollen powder is then mixed with an equal part by weight of water to form the first solution. This solution contains the fibrous undesired material as well as any body portions of the bees that have been gathered along with the pollen grains. These materials are found to adhere to pollen having the higher moisture content. Thus the drying provides contaminant separation as well as permitting subsequent milling to form the first solution.

The first solution is passed through a filtering screen similar to that used in the dairy industry and it relies on a gravity feed therethrough. The screen is fine and best results for the removal of plant fibrous material occurs with 100 mesh filters. After filtering, the first solution is ready to be added to honey to form a concentrate.

The concentrate or second solution is formed by the addition of the pollen-water first solution to honey of reduced viscosity. The honey is heated to above room temperature and preferably within the range of 110° to 120° F. in order to permit the concentrate to be dispersed within the fluid honey. It has been found that without heating to increase the fluidity of the honey, the first solution remains undispersed even when processing relatively small amounts with mechanical agitation.

The concentrate contains a larger proportion of heated honey than the first solution to facilitate its subsequent dispersal throughout a large reservoir of processed honey. In practice, the preferred volumetric ratio is 4 parts of honey to 1 part of first solution. If additional honey is used, the honey has to be heated at higher temperatures to permit uniformity of concentration throughout the mass and also adds to the cooling time required.

The concentrate or second solution is then added to a reservoir of processed honey to fortify the honey with the nutritional values present in pollen. Sufficient quantity of the concentrated second solution is added to provide a pollen content within the range of 120 to 150 mg. per ounce of honey. This proportion is an approximate restoration of the pollen content of natural honey.

The addition of the second solution to the reservoir of processed honey is enhanced by the use of conventional homogenizing equipment which results in pressure induced dispersal of the concentrate throughout the product.

While the foregoing description has referred to specific steps and ranges for activity with the description for preferred embodiment of the invention, it is recognized that many variations and modifications may be made therein without departing from the scope of the invention as claimed.

I claim:

1. A method of making a fortified honey product comprising the steps of:
   (a) drying pollen grains (at a relatively low temperature) for a period of time sufficient to reduce the moisture content therein to approximately six percent;
   (b) milling said pollen grains to form a pollen powder;
   (c) mixing said pollen powder with approximately equal parts by weight of water to form a first solution;
   (d) filtering said first solution to remove undissolved solids therefrom; (and)
   ((e)) heating a volume of honey to reduce the viscosity thereof; and
   (f) adding said first solution to said honey to provide a pollen-fortified honey concentrate.

2. The method in accordance with claim 1 wherein the step of drying said pollen grains includes heating said pollen grains to a temperature less than 140° F.

3. The method in accordance with claim 2 wherein the step of drying said pollen grains includes heating said grains to a temperature within the range of 105° to 115° F.

4. The method in accordance with claim 2 wherein the step of drying said pollen grains includes the step of maintaining said grains at a temperature less than 140° F. for a period within the range of 4 to 12 hours.

5. The method in accordance with claim 2 wherein the step of adding the first solution to honey includes the step of adding said first solution to honey in the approximate ratio of 1 to 4 by volume to form a second solution; said second solution constituting a fortified honey concentrate.

6. The method in accordance with claim 5 further comprising the step of adding said second solution to a reservoir of honey in sufficient proportions to form a pollen-fortified honey product.

7. The method in accordance with claim 6 wherein the step of adding said second solution to honey includes adding said second solution in sufficient quantity to provide pollen-fortification in the range of 120 to 150 mg per ounce of honey.

8. A method of making a fortified honey product comprising the steps of:
   (a) heating pollen grains to a temperature of less than 140° F. for a period of time sufficient to reduce the moisture content therein to approximately six percent;
   (b) milling said pollen grains to form a pollen powder;
   (c) mixing said pollen powder with an approximately equal part by weight of water to form a first solution;
   (d) filtering said first solution to remove undissolved solids therefrom;
   (e) adding said first solution to a volume of honey heated above room temperature to reduce the viscosity thereof in an approximate ratio of 1 to 4 by volume to form a pollen fortified honey concentrate.

9. The method in accordance with claim 8 further comprising the step of heating said honey prior to adding said first solution to a temperature within the range of 110° to 120° F.

10. The method in accordance with claim 9 wherein the step of filtering said first solution includes passing said solution through a 100 mesh filter.

11. The method in accordance with claim 8 wherein the step of milling the dryed pollen grains includes grinding said grains to form a powder which passes through a 60 mesh screen.

12. The method in accordance with claim 11 further comprising the step of adding said concentrate to a reservoir of honey in sufficient proportion to provide a fortified honey product containing pollen in the range of 120 to 150 mg per ounce of honey.

* * * * *